Feb. 4, 1941.   C. A. THURSTON   2,230,632
COUNTER MOLDING MACHINE
Filed Dec. 28, 1939   3 Sheets-Sheet 1

Inventor:
CHARLES A. THURSTON
by Thomson & Thomson
his Attys.

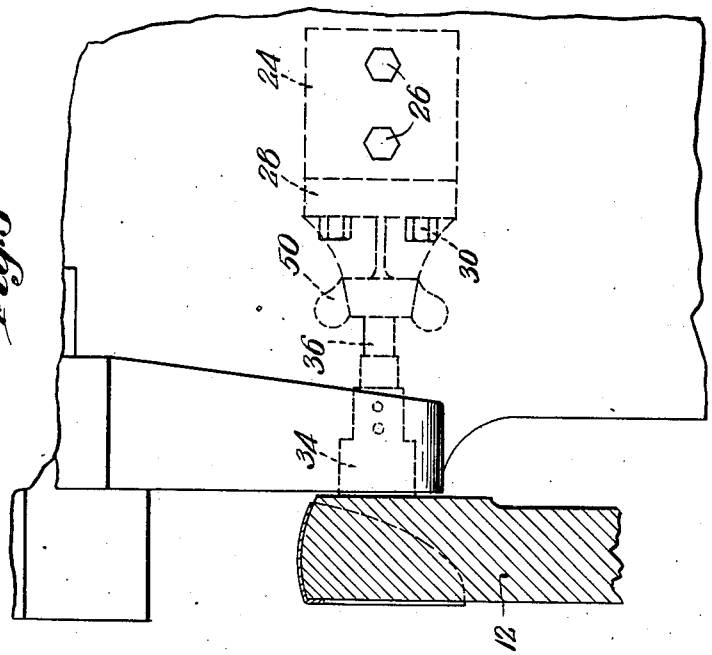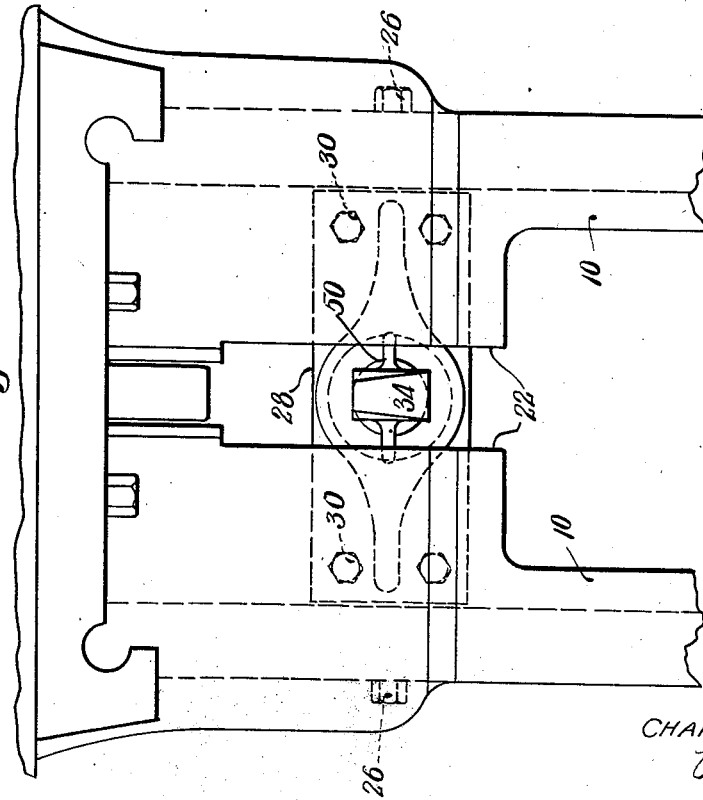

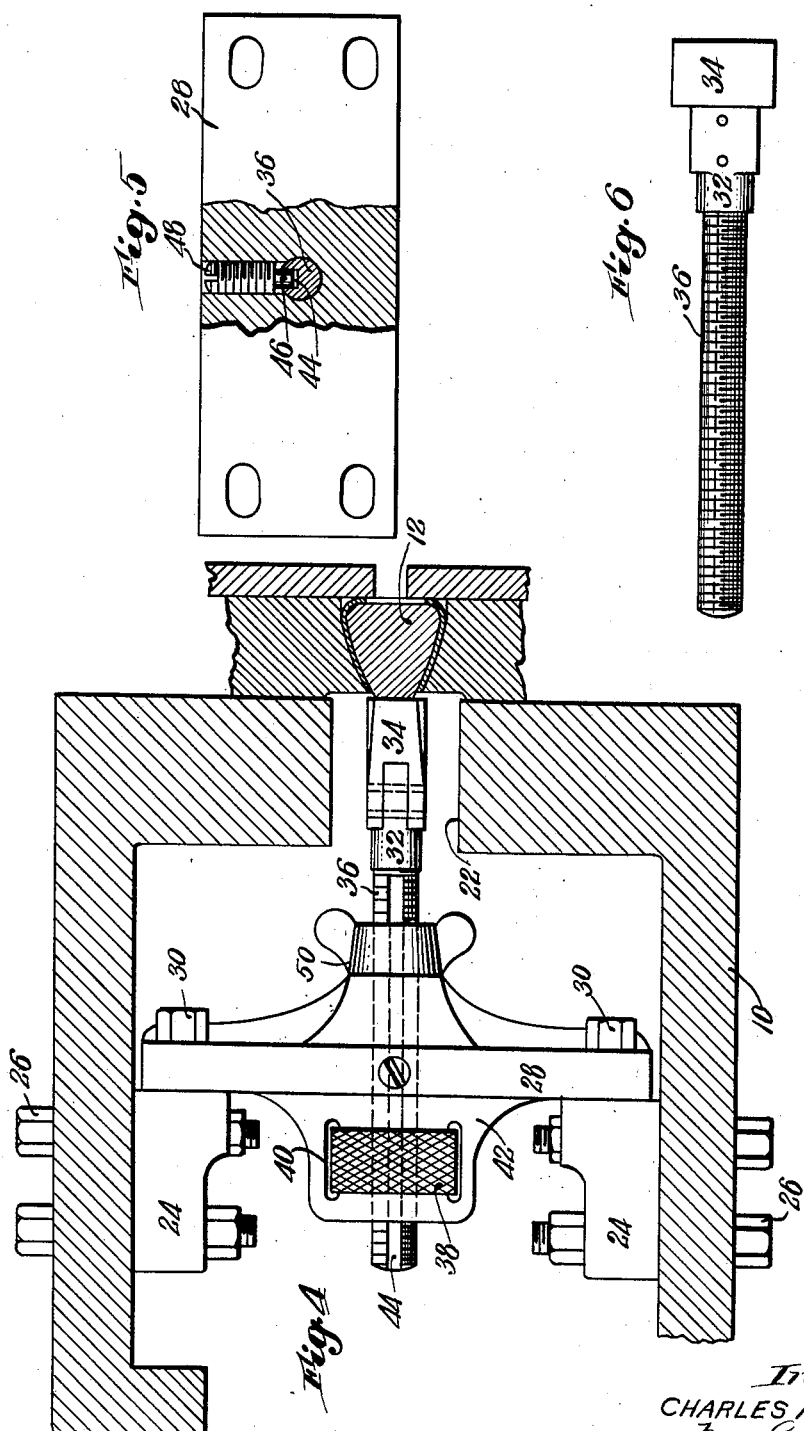

Patented Feb. 4, 1941

2,230,632

UNITED STATES PATENT OFFICE 2,230,632

COUNTER MOLDING MACHINE

Charles A. Thurston, Haverhill, Mass., assignor to Lowell Counter Co., Lowell, Mass., a corporation of Massachusetts Application December 28, 1939, Serial No. 311,361

2 Claims. (Cl. 12—66)

This invention relates to improvements in a counter molding machine, and more particularly a machine for molding shoe quarters.

Counter molding machines of the type which are adapted to shape the counter and turn in a heel seat flange are in common use and have in recent years been employed through the design of special dies to mold complete shoe quarters including the lining, counter and upper leather.

In such machines the female dies are closed by pressure about the male die and a wiper plate slides down to turn in the flange. It is found necessary to place shims between the upper end of the male die and a part of the frame in order to obtain the desired wiping pressure. This stop portion of the frame prevents use of the machine for molding quarters of high shoes.

It is an object of this invention to provide an improved counter molding machine in which the reaction of the male die to the wiping pressure as the flange is turned is received by an adjustable stop provided with means for manual setting permitting close adjustment of the wiping pressure to suit the particular conditions of the material that is to be molded.

It is a further object to mount the stop for the male die in such a manner that it will not interfere with the molding of quarters for high shoes.

In the drawings:

Fig. 2 is a fragmentary front elevation showing the frame and stop, the dies and wiper plate being removed;

Fig. 3 is a fragmentary side elevation;

Fig. 4 is a horizontal section;

Fig. 5 is an elevation of the mounting plate for the stop partially in section to show the pin which holds the stop against rotation; and Fig. 6 is an enlarged side elevation of the stop pin.

Figure 1:
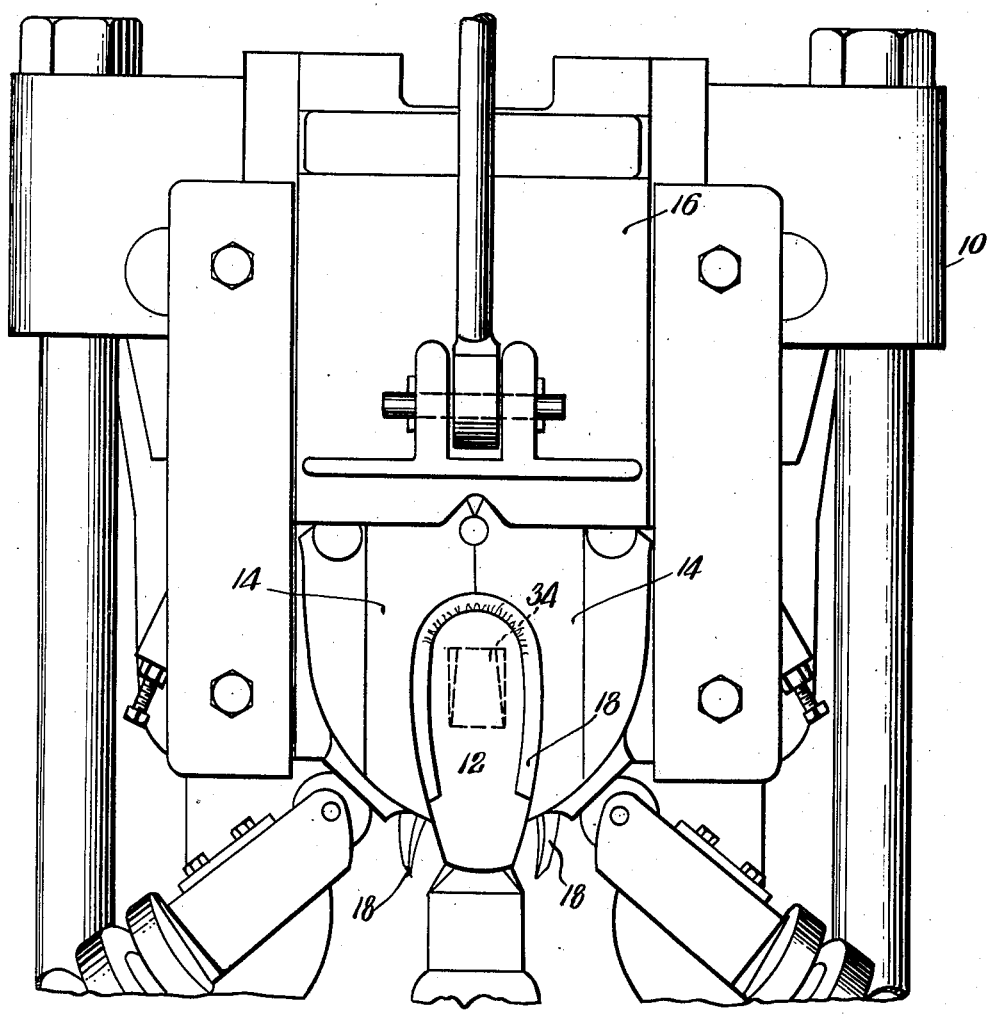
Fig. 1 is a front elevation of the upper end of a molding machine.

The counter molding machine includes a frame 10, a male plug die 12, female side molds 14 and a vertically slidable wiper plate 16. While the female molds are open, the counter or complete shoe quarter 18, which may have been preliminarily clam-shelled, is bent and inserted by the fingers of the operator into position over the male plug leaving a portion of the edge protruding to form the flange. Operating of the machine causes the female molds to close under heavy pressure and the wiper plate is moved downwards over the flat vertical faces of the mold parts to turn in the flange 20. The operating mechanism and the mounting of the molds is that customarily employed and need not be described in detail.

In a prior construction the male plug die abuts at its rear face against a part of the frame and it is necessary to use shims to move the die away from the frame in order to obtain a properly wiped flange as the wiper plate slides in fixed grooves and cannot be adjusted with respect to the male plug. In the improved design herein disclosed, a wide slot 22 is cut in the frame in back of the male die as shown in Fig. 4. One important advantage of the slot 22 is that it permits the insertion of the complete quarter portion and upper of a high shoe which cannot be molded where the frame is closed in back of the male die.

In order to form the necessary mounting for an abutment for the male die, a pair of brackets 24 are fixed to the side of frame 10 by the bolts 26 and a cross plate 28 is attached to the brackets 26 by the bolts 30. The plate 28 is bored to receive the horizontally movable abutment rod 32 which is formed at its front end with an abutment stop 34 against which the male plug die seats. The rear portion of rod 32 is threaded as at 36 to engage a knurled adjusting nut 38 received in an opening 40 formed in a boss 42 on the rear face of plate 28. The rod has a longitudinal keyway 44 which is engaged by a pin 46 on a screw 48 threaded into the plate 28. A wing nut 50 is threaded onto the rod 32, and when tightened against the boss 52 on the front face of plate 28 serves to hold the rod 32 and the abutment stop 34 in adjusted position.

The position of the male plug 12 with respect to the female molds 14 and the wiper plate 16 may be closely adjusted by means of the adjusting nut 38 and locking wing nut 50. The time of the operator formerly required to make adjustments is considerably reduced and better results in molding can be obtained. The opening behind the male die permits the insertion of counters or assembled quarters for molding in whole or in part and certain molding operations can be carried out which could not be performed on prior machines, such as the molding of the counter portions of the quarters for high shoes.

I claim:

1. In a counter molding machine, a frame, a male die movably mounted with respect to the frame, female mold members adapted to close under pressure around said male die, a vertically slidable wiper plate for forming a flange on the article to be molded, said frame having an opening behind the male die to permit the molding of quarters for high shoes, a transverse plate fixed to the side walls of the frame spaced rearwardly from said mold members, a rod having an abutment at its forward end mounted in said plate, and means for manually adjusting said rod in a horizontal direction to vary the position of the male die and the pressure of the wiper plate during the operation of forming the flange.

2. In a counter molding machine, a frame, a male die movably mounted with respect to the frame, female mold members adapted to close under pressure around said male die, a vertically slidable wiper plate for forming a flange on the article to be molded, said frame having an opening behind the male die to permit the molding of quarters for high shoes, a transverse plate fixed to the side walls of the frame, an abutment rod mounted in said plate, said male die being adapted to seat against said abutment rod at its forward end, means for holding said rod against rotation with respect to said plate, an adjusting nut received in said plate and having threaded engagement with said rod in order to vary the position of said rod and a locking nut for fixing the adjusted position of said rod.

CHARLES A. THURSTON.